April 14, 1970     H. E. RIORDAN     3,505,880
PNEUMATIC VIBRATORY DIGITAL SENSORS
Filed Jan. 20, 1967
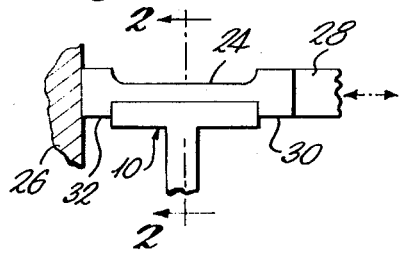
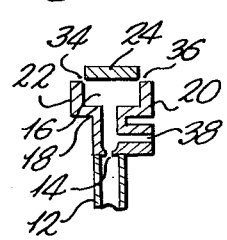
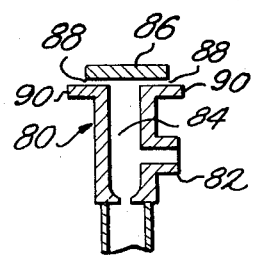
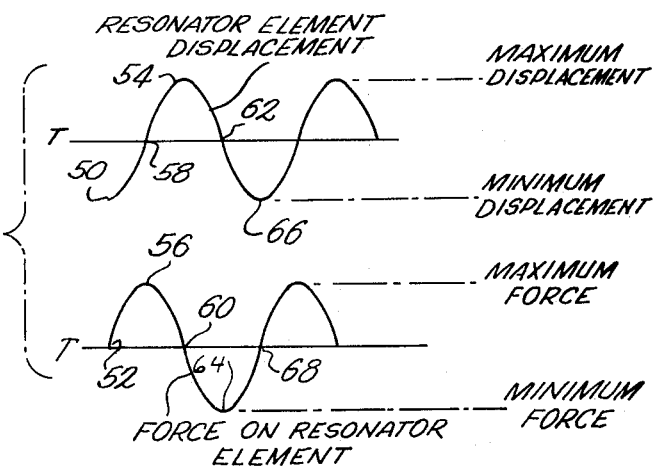
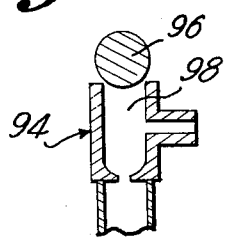
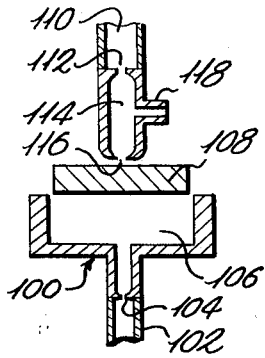
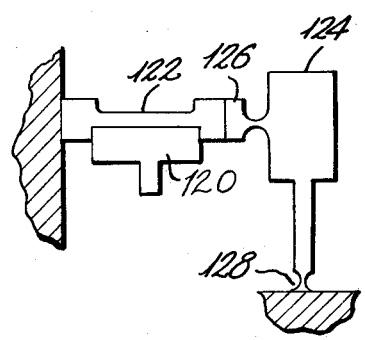
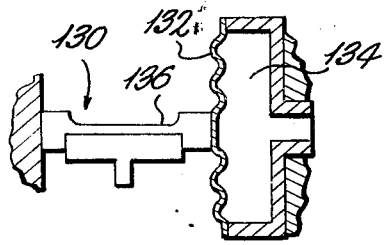
INVENTOR
Hugh E. Riordan
S. A. Giarratana &
K. A. Ohralik
BY
ATTORNEYS

United States Patent Office 3,505,880
Patented Apr. 14, 1970

3,505,880
PNEUMATIC VIBRATORY DIGITAL SENSORS
Hugh E. Riordan, Wyckoff, N.J., assignor to Singer-General Precision, Inc., a corporation of Delaware
Filed Jan. 20, 1967, Ser. No. 610,679
Int. Cl. G01p 15/02
U.S. Cl. 73—515                              13 Claims

ABSTRACT OF THE DISCLOSURE

The patent specification and drawings disclose a pneumatic sensor which produces an output in the form of digital pulses that are representative of unknown quantities to be monitored, for example pressure or acceleration.

The sensor includes a coupling chamber defined by a base, side walls and a vibrating resonator element wherein fluid pulses are produced by the venting and closing of the chamber through control orifices formed by the chamber walls and the vibrating element. The frequency of vibration of the resonator element, which determines the frequency of the digital output pulses, varies with its axial load. When axial forces representative of variations in the quantity to be monitored are applied to the resonator element its vibrational frequency is changed thus changing the frequency of the digital pulse output, which thereby is representative of the monitored quantity.

BACKGROUND OF THE INVENTION

This invention relates to fluid flow devices, and more particularly, to pneumatic vibratory digital sensors.

In many guidance and control applications, pneumatic systems provide an advantage over prior art mechanical and electrical systems. However, pneumatic analog circuits for producing an output signal proportional to the integral of the input with high precision, that is 0.01 percent or better, cannot be built at the present time. Furthermore, it is conceivable that because of the temperature sensitivity of these circuits, they may never be practicable for many applications. Pneumatic counting circuits have the required accuracy and stability and, whereas analog pneumatic circuits produce signals that are not readily integrated, pneumatic digital circuits produce output signals in the form of a pulse frequency which are readily integrated by simply counting the number of pulses. For example, where inertial velocity information is required, a pneumatic accelerometer having a digital output which could be integrated with a counting circuit, has been found to be quite reliable and efficient.

SUMMARY OF THE INVENTION

The present invention relates to a pneumatic sensor adapted to sense changes in an applied force which is representative of variations in a monitored quantity and to produce pneumatic pulses, the frequency of which is proportional to the applied force. The pulses may be transmitted to an appropriate counter circuit which counts the applied pulses from the fluid sensor to provide an integral of the force applied to the pneumatic sensor.

The sensor consists of a fluid flow device having a supply orifice and restrictor, and a coupling chamber which may be connected to a counting means through an outlet port. A force responsive mechanical resonator, such as a vibrating beam or string, is positioned over the coupling chamber to partially close the top of the chamber. Coupling orifices are defined between the resonator and the walls of the coupling chamber. When gas is supplied to the coupling chamber through the supply orifice, the resulting flow out of the coupling orifices causes the resonator to vibrate and pressure pulses are produced in the coupling chamber at the frequency of vibration of the resonator element.

The frequency of vibration of the resonator element is determined in part by the axial load on the resonator. With an input force applied along the axis of the resonator, the frequency of vibration varies with the applied input force. The pressure pulses produced in the coupling chamber are transmitted to and counted by the counting means to provide the integral of the force applied to the pneumatic sensor.

Among the objects of the present invention are the provision of a pneumatic sensor to produce a digital output corresponding to variations in a monitored quantity, to provide a sensor to produce a pulsed fluid output having a frequency proportional to an input force representative of a monitored quantity, and to provide a pneumatic sensor adapted to be utilized with a plurality of sensing devices such as an accelerometer or pressure transducer.

Other objects and further scope of applicability of the present invention will become apparent from the detailed description to follow, taken in conjunction with the accompanying drawings described below.

BRIEF DESCRIPTION OF THE DRAWINGS

FIG. 1 is a schematic view in elevation of one embodiment of the present invention;

FIG. 2 is a sectional view taken along the line 2—2 of FIG. 1;

FIG. 3 is a graphical representation of the pressure force on the resonator and its relationship to the movement of the resonator;

FIG. 4 is a sectional view of another embodiment of the invention taken in the same manner as FIG. 2;

FIG. 5 is a sectional view of another embodiment of the invention also taken in the same manner as FIG. 2;

FIG. 6 is a sectional view of a further embodiment of the invention also taken in the same manner as FIG. 2;

FIG. 7 illustrates a sensor similar to that of FIGS. 1 and 2 utilized in conjunction with a seismic mass accelerometer force input means; and FIG. 8 is a view in partial section illustrating a sensor similar to that shown in FIGS. 1 and 2 utilized in conjunction with a pressure transducer force input means.

DESCRIPTION OF THE PREFERRED EMBODIMENTS

As illustrated in FIGS. 1 and 2, the pneumatic sensor 10 comprises a supply port 12 having a flow restrictor 14 for producing a controlled fluid input flow from a supply source (not shown).

The supply port 12 feeds the fluid into a coupling chamber 16 formed of a base 18 and side walls 20 and 22. The top of the chamber 16 is defined by a flexible resonator element 24. The chamber 16 is defined in its two ends by extensions 30 and 32 of the resonator element 24. The resonator element 24 is connected at one end to a fixed point, such as a wall 26 or the like, and connected to a means 28 for applying the force to be monitored to the resonant element as an axial load. The resonator element 24 is in the form of a vibrating beam in the embodiment of the invention shown in FIG. 1. Two coupling orifices 34 and 36, which vent the coupling chamber 16, are formed between the edges of the resonator element 24 and the coupling chamber walls 20 and 22. An output port 38 connects the coupling chamber 16 to a suitable pressure pulse counting means (not shown).

In operation, a steady stream of fluid is introduced into the sensor 10 through the inlet port 12 and flow restrictor 14 to the coupling chamber 16. This fluid flow builds up a pressure within the coupling chamber 16 which causes the resonator element 24 to flex outwardly at its center thereby allowing fluid to escape through the coupling orifices 34 and 36. As the gas flows into the coupling chamber, the pressure rises at a rate dependent on the size of the inlet restrictor 14, the volume of the coupling chamber 16 and the size of the coupling orifices 34 and 36. As the pressure in the chamber 16 continues to increase and the force on the resonator 24 and hence the deflection of the resonator 24 continues to increase, the coupling orifices 34 and 36 will be opened until the exit flow from the chamber 16 and the entrance flow will be equal. As the deflection of the resonator 24 continues to increase, thereby causing the exit flow through the coupling orifices 34 and 36 to exceed the entrance flow, the pressure in the coupling chamber 16 will begin to fall. The momentum of the resonator 24, however, will cause its deflection to continue to increase, even though the pressure in the chamber 16 and hence the force on the resonator 24 is decreasing.

Because of the compressibility of the gas and the volume of the chamber 16, the pressure in the chamber 16 will fall less rapidly than the rate of increase of deflection of the resonator 24 and consequent opening of coupling orifices 34 and 36 might otherwise suggest. This lag behind the deflection of the pressure-induced force on the resonator 24 is characteristic of the entire cycle of oscillation.

Thus, as the resonator 24 reaches the extreme maximum of its deflection, the pressure-induced force has not yet reached its minimum. In like manner, during the next half cycle of oscillation, as the resonator 24 deflection reaches its minimum, producing the minimum opening of the coupling orifices 34 and 36, the pressure in the chamber 16 and hence the force on the resonator 24 will not yet have reached its maximum value.

Considering the motion of the resonator to be essentially a sinusoidal function of time, if the orifices 34 and 36, the volume of the chamber 16, and the supply restriction are chosen so that the lag of chamber pressure behind deflection is ¼ period of oscillation, the pressure force will be in phase with the resonator velocity. This is the well-known, sufficient condition for sustained oscillation, provided that the magnitude of the force is such that the work done on the resonator per cycle of oscillation by the pressure force equals the energy lost from the resonator per cycle due to internal friction, gas damping and similar effects. This cycle repeats itself as long as the fluid input remains the same to produce pressure oscillations or pulses in the chamber.

The way in which the lag between the actual deflection displacement of the resonator element 24 and the pressure forces acting upon it maintain the oscillation of the element 24 may be better understood by reference to FIG. 3 illustrating a graphical representation of vibration displacement of the resonator element relative to the force exerted on the element on a time axis. On the vibration displacement curve, the maximum displacement of the resonator element is represented as a positive value while the minimum displacement is represented by a negative value. The maximum force due to the pressure in the coupling chamber on the resonator element is represented as a positive value on the force curve, while the minimum force is represented as a negative value.

With the resonator element vibrating in the normal manner, the following instantaneous conditions may be graphically represented. At the minimal vibration displacement position of the resonant element, shown as point 50, the force on the resonant element due to the pressure in the coupling chamber from the supply fluid is in the process of being built up at point 52 from a minimum value. As the pressure and corresponding force increases, it causes the resonator element to flex outwardly at its center, from its minimum displacement position 50 to its maximum displacement position at point 54. While the resonator element is moving to this maximum displacement position, the control orifices are opened which vent the coupling chamber. Because of the volume of the coupling chamber, there is a time delay between the opening of the vents and the decay of chamber pressure. Initially the movement of the resonator element results in only a minimum opening of the control orifices and the amount of supply fluid being fed into the coupling chamber is greater than that being vented out of the control orifices. This results in the pressure within the coupling chamber continuing to build up and the force exerted on the resonator element increases. As the resonator element continues to move and open the control orifices, a point is reached when the fluid supply equals the fluid vented. At this point, the force exerted on the resonator element is at a maximum point 56 while the resonator element displacement is in between the maximum and minimum points 50 and 54 at a point designated as 58 on the displacement curve. As the resonator continues to move toward its maximum deflection point 54, the pressure force on the resonator begins to drop, but, as mentioned above, the pressure drop is delayed because of the chamber volume.

After the resonator element reaches its maximum displacement point 54, it begins to move back to its closed position while the force on the element continues to decrease between points 60 and 64 on the curve. When the resonator element reaches a point 62 the venting through the control orifices equals that supplied and the pressure in chamber 16 will stop decreasing. At this point, the pressure within the coupling chamber and the corresponding force on the resonator element is at a minimum at point 64. As the resonator element continues to close to its minimum displacement position 66, the pressure force on the resonator element again begins to rise. It will be noted that the pressure force on the resonator element is at its maximum driving the element outwardly just when the element is moving rapidly from its minimum deflection position to its maximum deflection position, and that the pressure force is at a minimum when the element is moving back from its maximum deflection position to its minimum. In this manner, the vibration of the resonator element is maintained.

In order that the vibration frequency of the resonator element be independent of the temperature and pressure of the supply gas, and the displacement vibration amplitude, it is necessary that the phase lag between the resonator element vibration displacement and the pressure force produced by the fluid be as close to 90 degrees as possible. In order to satisfy this requirement, the resonant frequency of the coupling chamber should be at least ten times the fundamental mechanical natural frequency of the resonator element. To further assure the 90 degree lag, the time constant of the delay circuit formed by the resistance of the coupling orifice and the acoustic capacitance of the coupling chamber is preferably 100 times the period of vibration of the resonator element.

The rapid pressure change in the coupling chamber 16 produces pressure pulses which are transmitted through the output port 38 to a suitable counting instrument. The frequency of the pressure pulses produced depends upon the vibration frequency of the resonator element, which varies with its axial load. That is, application of an axial load will place the resonator element under either tensile or compressive stress depending upon the direction and magnitude of the load. As is well known in the art, this change in the stress condition of the resonator element will produce an accompanying change in its fundamental vibration frequency. Thus, for example, placing of the element under compression will lower the vibration frequency thereof whereas application of a tension load will increase the vibration frequency thereof. Accordingly, the pulse frequency varies with the axial load.

As shown in FIG. 1, one end of the resonator element 24 is attached to a means 28 which applies the force to be monitored as a axial load on the resonator element 24. Changes in the force applied by the force applying means 28, in the direction shown by the arrow, will change the pulse frequency as hereinabove described to give an indication of the variable which the particular force represents.

In the embodiment of the invention shown in FIG. 4, the pneumatic sensor is generally designated by the reference numeral 80. An outlet port 82 is connected directly to a coupling chamber 84 to transmit pressure pulses caused by the vibration of a resonator element 86 which closes the top of the coupling chamber 84. Control orifices 88 are defined between the bottom of the resonator element 86 and extensions 90 on the side walls of the chamber. The operation of the pneumatic sensor 80 is the same as was described with reference to the pneumatic sensor 10 shown in FIGS. 1 and 2.

The embodiment of the fluid sensor shown in FIG. 5, designated by the reference numeral 94, includes a resonator element 96 which is a vibrating string. The fluid sensor 94 has a coupling chamber 98, the walls of which are contoured so that the vibrating string 96 closes the top of the chamber 98. The vibrating string element operates in the same manner as the vibrating beam element shown in FIGS. 1 and 2 to produce digital pressure pulses except that the axial load must be applied to the vibrating string 96 to place it in tension whereas the vibrating beam may be placed in compression or tension.

Instead of a vibrating string, a vibrating tape could be used as the resonator element, in which a chamber wall structure such as that illustrated in FIG. 4 could be used. The difference in operation between the beam structure and the string or tape vibrating element resides in the source of spring force which interacts with the distributed mass to define the zero load natural frequency of operation. In a beam, this restoring or spring force is provided by the bending stiffness in the beam, and in a string or tape, the spring force is provided by stretching of the string between its ends so that it is in tension.

The pneumatic sensor illustrated in FIG. 6 is designated generally by the reference numeral 100. The pneumatic sensor 100 has a supply port 102 and a flow restrictor 104 for controlling the amount of driving fluid into a coupling chamber 106. A resonator element 108 of the type described above with reference to FIGS. 1 and 2 is positioned over the open portion of the coupling chamber 106. Fluid is introduced into the chamber 106 and a vibrating frequency occurs in the same manner as was described with reference to the sensor of FIGS. 1 and 2. The output of the pneumatic sensor 100 is obtained by using an auxiliary pneumatic device consisting of a fluid supply port 110 having a flow restrictor 112 which is coupled to a flow chamber 114. The flow chamber 114 is provided with a pickup orifice 116 juxtaposed to the resonator element 108. An outlet port 118 is tapped into the flow chamber 114 to transmit pressure pulsations to a suitable pulse counter means (not shown). When the resonator element 108 is at its maximum deflection position, flow out of the pickup orifice 116 will be at a minimum thereby causing a build up of pressure within the flow chamber 114. When the resonator element 108 is at its minimum deflection position, flow out of the pickup orifice 116 will be a maximum which will decrease the pressure in the flow chamber 114. Accordingly, the vibration of the resonator element 108 will cause pressure pulses to be produced in the chamber 114 which are transmitted through the outlet port 118.

FIGS. 7 and 8 illustrate two practical uses for the pneumatic sensors of the present invention. In FIG. 7, the vibration frequency of a resonator element 122 is changed by an axial load provided by a seismic mass 124 attached to the resonator element 122 by a flexure hinge 126. The seismic mass 124, which is movably mounted by a flexure hinge 128, responds to applied acceleration to apply an axial load to the resonator element 122 proportional to the applied acceleration. Accordingly, the output pulse frequency from the pressure sensor 120 will vary in accordance with applied acceleration.

The pneumatic sensor 130 illustrated in FIG. 8 operates with a pressure diaphragm 132 which responds to pressure in a pressure chamber 134. The diaphragm 132 is fixed to a resonator element 136 in such a manner to apply an axial load to the element 136 corresponding to the pressure in the chamber 134. A change in the pressure in chamber 134 will cause the diaphragm 132 to change the axial load upon the resonator element 136. This change in axial load then changes the vibration freqenucy of the resonator element which in turn changes the frequency of the pressure pulse output.

It will be appreciated that the above description is illustrative only and not limiting and many modifications may be made to the specific embodiments described above without departing from the spirit and scope of the invention, which is defined in the appended claims.

I claim:

1. A pneumatic sensor for producing pressure pulses having a frequency representative of a quantity to be monitored comprising means defining a chamber wherein pressure pulses are produced, means for continuously supplying fluid to said chamber, control orifice means communicating with said chamber to periodically vent said chamber wherein said control orifice means is defined as at least one orifice between said chamber walls and a resonator element which vibrates with respect to said chamber walls to open and close said orifice thereby periodically venting said chamber, and means to vary the frequency of venting of said chamber through said control orifice means responsive to said quantity to be monitored to vary the frequency of said pressure pulses wherein said means to vary the frequency of venting of said chamber comprises means to apply a load to said resonator element and to vary said load with said monitored quantity, said load being effective to vary the stress and to thereby vary the vibrational frequency of said resonator element.

2. The pneumatic sensor of claim 1 wherein said resonator element comprises a viabrating beam.

3. The pneumatic sensor of claim 1 wherein said resonator element comprises a vibrating string.

4. The pneumatic sensor of claim 1 wherein there is provided an outlet port communicating with said chamber to transmit pressure pulses produced in said chamber.

5. A pneumatic sensor for producing pressure pulses having a frequency representative of a quantity to be monitored comprising means defining a coupling chamber, a resonator element closing one side of said chamber and defining with the walls of said chamber at least one control orifice communicating with said chamber, inlet means for providing a continuous fluid supply to said chamber, said resonator element being adapted to be deflected by the pressure in said chamber to vary the venting of said chamber provided by said control orifices so that said resonator element vibrates and the pressure in said chamber varies cyclically as a result of the fluid flow into said chamber through said inlet means and out through said control orifices, and means responsive to said quantity to be monitored for applying an axial load to said resonator element, said applied axial load varying in accordance with said quantity and being effective to stress said resonator element to vary the vibrational frequency thereof accordingly.

6. A pneumatic sensor as recited in claim 5 wherein phase difference between the vibrational deflection of said resonator element and a component of the pressure variation in said chamber is 90 degrees.

7. A pneumatic sensor as recited in claim 5 wherein said resonator element defines with the walls of said chamber two control orifices, one on each side of said resonator element.

8. A pneumatic sensor as recited in claim 5 wherein there is provided an outlet port communicating with said chamber to transmit the pressure variations produced in said chambers.

9. A pneumatic sensor as recited in claim 5 wherein there is provided means juxtaposed to said resonator element to define with said resonator element an additional orifice which varies with vibrational deflection of said element, and means to supply fluid flow through said additional orifice whereby the rate of flow through said additional orifice varies cyclically at the vibrational frequency of said resonator element.

10. The pneumatic sensor of claim 5 wherein said resonator element comprises a vibrating beam.

11. The pneumatic sensor of claim 5 wherein said resonator element comprises a vibrating string.

12. An accelerometer comprising the pneumatic sensor of claim 5 wherein said means for axially loading said resonator element to vary the stress thereof comprises a proof mass positioned to apply said axial load to said resonator element to thereby vary the frequency of vibration of said resonator element in accordance with the acceleration applied to said proof mass.

13. A pressure sensor comprising the pneumatic sensor of claim 5 wherein said means for axially loading said resonator element to vary the stress thereof comprises a diaphragm connected on one side thereof to the axial end of said resonator element, the other side of said diaphragm being responsive to an applied pressure to be monitored.

References Cited
UNITED STATES PATENTS

| | | | |
|---|---|---|---|
| 2,959,965 | 11/1960 | Holmes | 73—517 |
| 3,046,789 | 7/1962 | Boss | 73—517 |
| 3,260,456 | 7/1966 | Boothe | 235—200 |
| 3,392,739 | 7/1968 | Taplin et al. | |

JAMES J. GILL, Primary Examiner

U.S. Cl. X.R.

73—388, 406, 517; 137—81.5; 235—200